Dec. 8, 1959  G. D. DEAL  2,915,954
SHEET FILM DEVELOPING RACK
Filed Feb. 28, 1957  3 Sheets-Sheet 1
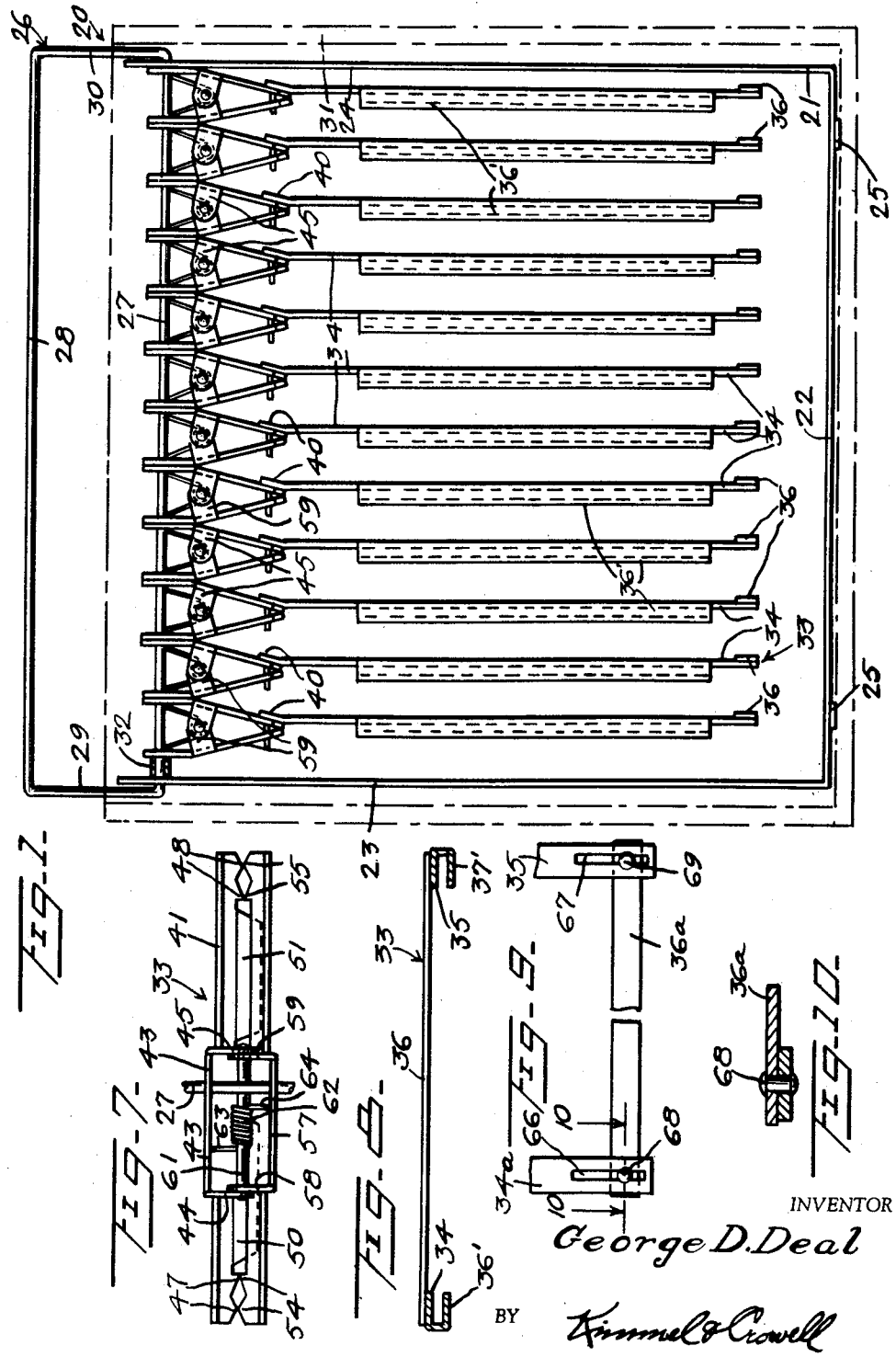
INVENTOR
George D. Deal
BY Kimmel & Crowell
ATTORNEYS Dec. 8, 1959    G. D. DEAL    2,915,954
SHEET FILM DEVELOPING RACK
Filed Feb. 28, 1957    3 Sheets-Sheet 2
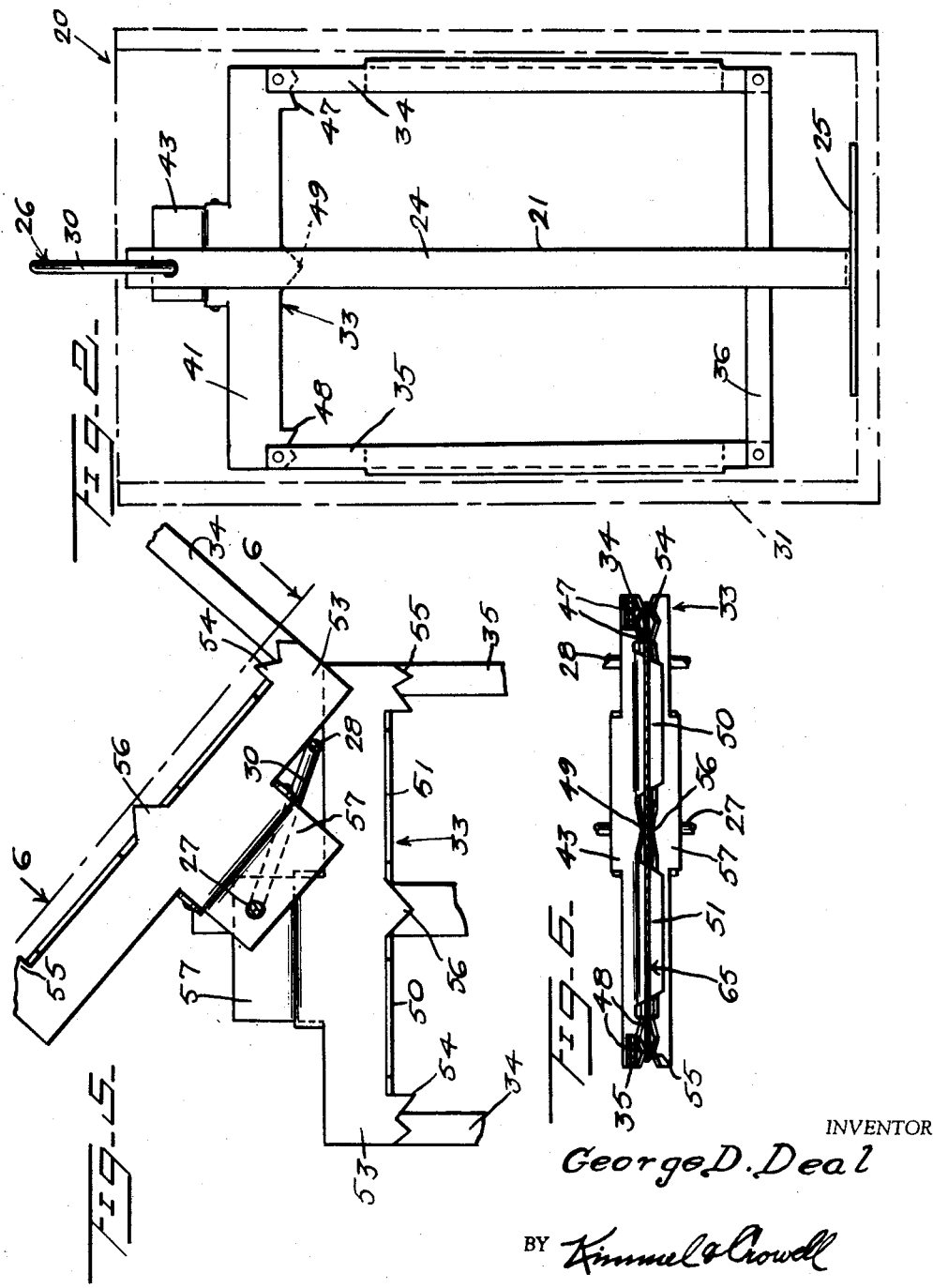
INVENTOR
George D. Deal
BY Kimmel & Crowell
ATTORNEYS

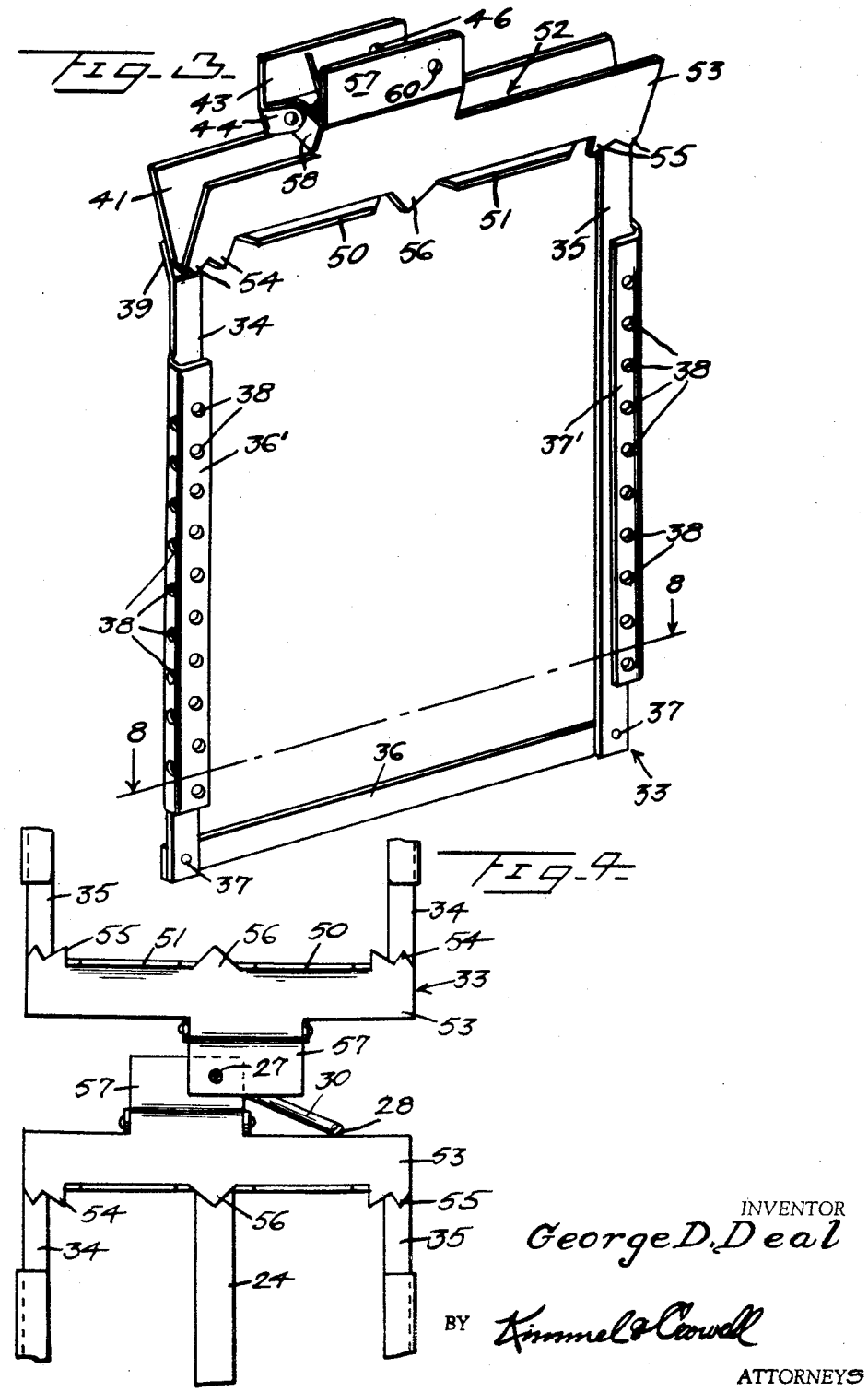

United States Patent Office 2,915,954
Patented Dec. 8, 1959

2,915,954

SHEET FILM DEVELOPING RACK

George D. Deal, Arlington, Va.

Application February 28, 1957, Serial No. 643,091

2 Claims. (Cl. 95—100)

The present invention relates to a sheet film developing rack, and more particularly to a rack of this type for developing a plurality of film sheets.

The primary object of the invention is to provide a sheet film developing rack having a plurality of sheet film holders thereon arranged for ease of loading in complete darkness.

Another object of the invention is to provide a sheet film developing rack which will support all of the film sheets of a conventional film pack.

A further object of the invention is to provide a sheet film developing rack with which a plurality of film sheets can be simultaneously immersed in developing, fixing, and washing solutions without removal from the rack.

A still further object of the invention is to provide in a sheet film developing rack, a film holder including a resilient clamp and means for guiding the film with respect to the clamp for inserting film in the clamp in the dark.

Another object of the invention is to provide a sheet film developing rack which is inexpensive to manufacture, simple to use in complete darkness, and which supports the film so that the normal expansive and contractive movements thereof will not damage the film.

Other objects and advantages will become apparent in the following specification when considered in the light of the attached drawings, in which:

Figure 1 is a side elevation of the invention shown in position in a developing tank, illustrated in broken lines.

Figure 2 is an end elevation of the invention, illustrated in a film developing tank, shown in broken lines.

Figure 3 is a perspective view of one of the film holders.

Figure 4 is a fragmentary transverse sectional view illustrating the position of one of the film holders inverted to loading position, with parts broken away for convenience of illustration.

Figure 5 is an enlarged view similar to Figure 4, illustrating the position of one of the film holders prior to the movement to loading position.

Figure 6 is a fragmentary transverse cross-section taken along the line 6—6 of Figure 5, looking in the direction of the arrows, with parts broken away for convenience of illustration.

Figure 7 is a fragmentary top plan view of one of the film holders.

Figure 8 is a fragmentary transverse sectional view taken along the line 8—8 of Figure 3, looking in the direction of the arrows.

Figure 9 is a fragmentary end elevation of a modified form of film holder.

Figure 10 is an enlarged fragmentary transverse section taken along the line 10—10 of Figure 9, looking in the direction of the arrows.

Referring now to the drawings in detail wherein like reference characters indicate like parts throughout the several figures, the reference numeral 20 indicates generally a sheet film developing rack constructed in accordance with the invention.

The developing rack 20 includes a generally U-shaped frame member 21 having an elongated horizontal portion 22 and a pair of upright opposite end portions 23 and 24, respectively. The horizontal portion 22 of the frame 21 is provided with a pair of spaced parallel feet 25 secured thereto by welding or the like and extending transversely thereof to support the frame 21 in upright position on a base.

A wire bale, generally indicated at 26, is provided with a horizontal shaft portion 27 having its opposite ends journalled in the upper ends, respectively, of the members 23 and 24 of the frame 21 and having a handle portion 28 arranged in spaced parallel relation thereto and integrally conncted therewith by opposite integral end portions 29 and 30, respectively.

The frame 21 is adapted to be positioned within a developing tank 31 illustrated in broken lines in Figures 1 and 2. A spacer collar 32 is mounted on the shaft portion 27 of the bale 26 in contact with the member 23 of the frame 21.

A plurality of film holders, generally indicated at 33, are illustrated in detail in Figures 3 through 8. Each of the film holders 33 comprise a pair of spaced parallel side frames 34 and 35, respectively, connected at their lower ends by means of a base frame 36 having its opposite ends spot welded at 37 thereto.

Each of the side frames 34 and 35 are provided with inwardly facing reverted channels 36' and 37', respectively. The channels 36' and 37' are provided with a plurality of circulation openngs 38 of any desired size and number to permit the ready flow of fluids interiorly of the channels 36' and 37'.

Each of the side frames 34 and 35 has the upper end thereof offset at 39 and 40, respectively, at an angle thereto, for reasons to be assigned.

A plate 41 extends between the side frame members 34 and 35 and is secured to the angularly offset end portions 39 and 40 thereof by means of electric spot welding or the like. The plate 41 extends at an angle to the side frame members 34 and 35 and has a centrally offset integral handle member 43 extending from its upper edge in parallel relation to the side frame members 34 and 35.

A pair of inwardly bent ears 44 and 45, respectively, extend in parallel relation from the plate 41, and the handle portion 43 is provided with a bore 46 arranged centrally of the side frame members 34 and 35. The lower end of the plate 41 is provided with jaw teeth 47 and 48, respectively, adjacent the opposite side edges thereof, and a jaw tooth 49 intermediate the opposite sides thereof.

The lower edge of the plate 41 is provided with a horizontal flange 50 between the teeth 47 and teeth 49, and a second horizontal flange 51 between the teeth 48 and 49. The horizontal flanges 50 and 51 are guide flanges and will be more fully explained below.

A resilient clamp, generally indicated at 52, comprises a plate 53 provided on its opposite side edges with teeth 54 and 55, respectively, and with a tooth 56 intermediate the teeth 54 and 55, as best shown in Figure 3. The teeth 54, 55 and 56 are adapted to cooperate with the teeth 47, 48 and 49, respectively, on the bottom edge of the plate 41.

A handle member 57 extends integrally from the upper edge of the plate 53 in parallel relation to the side frame members 34 and 35. Ears 58 and 59, respectively, extend perpendicularly from the plate 53 toward the ears 44 and 45, respectively, of the plate 41. The handle member 57 is provided with a central bore 60 aligned with the bore 46, for reasons to be assigned.

A shaft 61 extends between the ears 44, 45, 58 and 59 pivotally securing the plate 53 to the plate 41. A coil spring 62 is journalled on the shaft 61 and has one end 63 engaging the handle portion 43 and the other end 64 engaging the handle portion 57 normally biasing the handle portions 43 and 57 apart, and consequently biasing the teeth 54, 55 and 56 into respective engagement with the teeth 47, 48 and 49.

Referring particularly to Figure 6, it will be noted that a strip of cut film, sheet film, or the like, is generally indicated at 65 clamped between the teeth 47, 48 and 49 and the teeth 54, 55 and 56, respectively.

Referring now to Figures 9 and 10 wherein a modification of the invention is illustrated, side frames 34a and 35a have a cross frame member 36a extending therebetween. The lower ends of the side frames 34a and 35a are provided with vertical slots 66 and 67, respectively. The opposite ends of the bottom frame member 36a are provided with slide rivets 68 and 69, respectively, which engage respectively through the slots 66 and 67 to permit the vertical adjustment of the bottom frame member 36a with respect to the side frame members 34a and 35a. The bottom frame member 36a is made adjustable in the modification illustrated in Figures 9 and 10 to accommodate the film holder 33 to films 65 of variable length.

Referring now to the use and operation of the invention, it should be understood that a plurality of the film holders 33 are supported on the shaft 27 which extends through the bores 46, 60 thereof, as illustrated in Figure 1, and are positioned in relatively tight engagement between the portions 23 and 24 of the frame 21 and held in position by the spacer 32.

The present invention is intended for use chiefly with film packs of conventional design and is provided with twelve film holders 33 in order to accommodate the complete conventional film pack. In loading the rack 20, it is positioned on the feet 25 on a work bench with the film holders 33 depending from the shaft 27. The film holder 33 adjacent the upright portion 23 or 24 of the frame 21 is swung to an inverted position, as illustrated in Figure 5, where it is supported by the handle portion 28 of the bale 26 at an angle to the vertical.

With the room completely darkened, a sheet of film 65 is removed from the film pack and the film holder 33 is moved to a vertical position, as illustrated in Figure 4. The film sheet 65 is then inserted between the channels 36' and 37' and the side frame members 34, 35, respectively, and permitted to slide downwardly therein until the film comes to rest on the flanges 50, 51 adjacent to the clamp member 52. The film strip 65, while in this position, is held by the fingers of one hand, while the fingers of the other hand squeeze the handle members 43 and 57 together causing the teeth 54, 55, 56 to flip outwardly past the film sheet 65 so that the film sheet 65 lodges between the teeth 47, 48, 49 and the teeth 54, 55, 56, respectively, whereupon the handle portions 43 and 57 are released so that the film sheet 65 is clamped as described above.

It should be noted that the laterally offset handle portions 43 and 57 are such that they are out of line with the remainder of the handle portions 43, 57 when the film holder 33 is inverted thus making it possible to actuate the clamp 52 when the film holder 33 is inverted. As the first film holder 33 is loaded, it is pivoted to a depending position below the shaft 27, and the next successive holder 33 is swung upwardly to its inverted position, as illustrated in Figure 5, preparatory to the insertion of the next film sheet 65 therein. Following the complete filling of the rack 20, it may be positioned in a tank 31 for development, fixing, washing, or any other photographic step desired.

Having thus described the preferred embodiments of the invention, it should be understood that numerous structural modifications and adaptations may be resorted to without departing from the scope of the appended claims.

What is claimed is:

1. A sheet film developing rack comprising a generally U-shaped frame including a pair of spaced parallel upright end portions connected at their lower ends by an elongated horizontal portion, an elongated horizontal shaft supported in the upper ends of said upright end portions, a plurality of parallel sheet film holders individually journalled on said shaft and depending therefrom with each of said sheet film holders including a pair of clamp jaws pivotally secured together and spring biased into clamping engagement, sheet film guide means secured to and depending from one of said clamp jaws, and a pair of spaced apart opposed handles formed integrally on said clamp jaws and extending upwardly therefrom, said handles being offset laterally with respect to the center of said clamp jaws and having said shaft extending therethrough on substantially the vertical center line of said film holder, whereby each of said film holders may be pivoted on said shaft to an inverted loading and unloading position with the offset handle of said inverted holder out of alignment with the handles of the remaining holders to permit separation of the clamp jaws of the inverted holder.

2. A device as claimed in claim 1 wherein an elongated handle is secured in spaced apart parallel relation to said shaft and is adapted to be positioned in contact with the upper edges of said depending film holders for engagement by and support of an inverted film holder when in loading and unloading position.

References Cited in the file of this patent

UNITED STATES PATENTS

| 1,424,873 | Boxell | Aug. 8, 1922 |
| 1,825,310 | Engstrom | Sept. 29, 1931 |
| 2,288,325 | Rodier | June 30, 1942 |
| 2,524,216 | Weissman | Oct. 3, 1950 |
| 2,525,746 | Haughwout | Oct. 10, 1950 |
| 2,655,849 | White et al. | Oct. 20, 1953 |

FOREIGN PATENTS

| 405,552 | Germany | Nov. 6, 1924 |
| 510,446 | Great Britain | Aug. 1, 1939 |